United States Patent Office 3,290,410
Patented Dec. 6, 1966

3,290,410
COLD CURING REACTION LACQUERS CONTAINING AT LEAST ONE COMPONENT CONTAINING ETHYLENIC UNSATURATION CURABLE BY POLYMERIZATION
Erich Bäder, Hanau am Main, and Hubert Koert, Gross-Auheim, Germany, assignors to Deutsche Gold- und Silber-Scheideanstalt vormals Roessler, Frankfurt am Main, Germany
No Drawing. Filed June 1, 1962, Ser. No. 199,275
Claims priority, application Germany, June 6, 1961, D 36,268
10 Claims. (Cl. 260—862)

The present invention relates to reaction lacquers, based on esters of acrylic or methacrylic acid and/or unsaturated polyester resins, which are capable of cold hardening to colorless products.

The use of unsaturated polyester resins as casting resins or laminating resins, as well as their use in reaction lacquers, for example, in the furniture industry, is already known. Such lacquers have much to be desired with regard to their stability against weathering and light and against many chemicals, as well as their strength. The properties of polymethyl methacrylates are somewhat better and as a consequence casting and laminating resins based thereon are already known. On the other hand, it has not been possible to produce a technically acceptable reaction lacquer based on methyl methacrylate. The problems encountered therewith are considerably greater and of a different type than with the unsaturated polyester resins. For the production of a high quality reaction lacquer, whether it be based on saturated polyesters or esters of acrylic or methacrylic acid, requires a catalyst system which, even with the lacquer films and high monomer content, ensures rapid and colorless curing at low temperatures, such as room temperature, while avoiding evaporation losses and at the same time provides good processing properties for the lacquer when applied by spraying or pouring. In addition, the finished lacquer film must have the required strength. No catalyst system which meets the requirements indicated above has previously been found for reaction lacquers either based on unsaturated polyesters or on esters of acrylic or methacrylic acid. Although there may be some catalyst systems which give satisfactory results for certain purposes, they in all instances are unsatisfactory when curing of thin colorless films with access to air is concerned. This is especially true of lacquers based on acrylic or methacrylic acid esters.

In order to be able to cure reaction lacquers at room temperature it is necessary to add an accelerator (activator) in addition to the peroxidic catalyst (initiator). Cobalt compounds have become especially well known as accelerators but these are not effective with esters of acrylic or methacrylic acid. Furthermore, in lacquering tropical woods the polymerization is strongly hindered so that only insufficiently hard and poorly adhering films are obtained. Tertiary amines have also become known as accelerators. They cause rapid curing of unsaturated polyesters as well as of thicker layers of esters of acrylic and methacrylic acid. The rapidity of the cure, however, is decreased in lacquers based on methyl methacrylate as the starting materials can only be used in highly dilute form. The cured films in most instances are colored yellow to brown. This coloration is usually still plainly evident even in thin films. Lauryl mercaptan has also been used as an accelerator in conjunction with peroxides. While this combination produces colorless products when employed for thick layers, an insufficient cure is obtained so that a subsequent tempering treatment is always necessary. Thin lacquer films in this instance are also still soft after 1 day.

According to the invention it was unexpectedly found that reaction lacquers of polymerizable mixtures which cold cure completely in a short time and are practically completely colorless can be obtained if mixtures are employed which as essential components contain at least one monomeric and at least one polymeric ester of acrylic or methacrylic acid and/or at least one unsaturated polyester, if desired, together with other organic compounds copolymerizable therewith and if a certain catalyst system is employed therewith. The catalyst system employed according to the invention is composed of an acyl peroxide, a mono- or polyfunctional mercaptan and/or esters of mercapto acetic acid and a tertiary amine containing at least one aromatic radical directly bound to the nitrogen atom. It is furthermore essential that the mono- or polyfunctional mercaptan or ester or mercapto acetic acid be employed in a quantity which is at least about equivalent to the peroxide. For example, when a monofunctional mercaptan such as lauryl mercaptan is employed, at least one mol thereof should be employed per mol of peroxide, such as benzoyl peroxide. On the other hand, for example, when the difunctional glycol dimercapto acetate is employed it suffices to employ about one half mol per mol of the peroxide such as benzoyl peroxide. It has been found advantageous to employ the acyl peroxide in quantities of about 0.5 to 3%, preferably, 1.5%, by weight, the mercaptan or ester of mercapto acetic acid in quantities about equivalent to the peroxide and the tertiary amine in quantities of about 0.05 to 1.0%, preferably, 0.1 to 0.5%, by weight. The quantity of acyl peroxide should not be substantially below 0.5%. It is preferably employed in the form of a peroxide paste which, for example, is composed of equal parts of the peroxide and a phlegmatizing agent. Dimethyl phthalate, dibutyl phthalate, dioctyl phthalate and other similar substances usually known as plasticizers come into consideration as phlegmatizing agents.

Aromatic diacyl peroxides such as benzoyl peroxide, 4,4′-parachlorobenzoyl peroxide and toluyl peroxide are preferably employed.

Lauryl mercaptan, glycol dimercapto acetate and isooctylthioglycolate are preferred as the mercaptan or mercapto acetic acid ester components but others such as, for example, octyl mercaptan and the like can be employed. The mercapto acetic acid esters which can be employed are of the following general formulae:

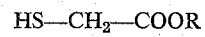

and

wherein R is alkyl, aryl, alkoxy alkyl or alkoxy alkoxy alkyl and $R_1$ is alkylene, oxy-alkylene or poly-oxy-alkylene.

In the case of the mercaptans it is preferable to employ the higher molecular weight members as the lower molecular weight members are less suited because of their unpleasant odor.

The amines employed in the catalyst system according to the invention are of special significance. As has already been indicated such amines must have at least one aromatic radical directly bound to the nitrogen atom. Examples of suitable tertiary amines, for example, are diethylol-p-toluidine, diisopropylol-p-toluidine, di-n-butylol-p-toluidine, diethyl aniline, dimethyl-p-toluidine and tetramethyldiamino-diphenyl methane (tetra base).

Secondary amines, even though containing an aromatic radical such as methyl aniline, are not suited for the purposes of the invention. Complete curing of the lacquer film does not occur when such secondary amines are employed as the amine component. The film only solidifies after a longer period of time because of the evaporation of the monomer. The same is true but to a greater extent of primary aromatic amines as well as of tertiary aliphatic amines such as triethyl amine. These amines cause no hardening whatsoever even after 24 hours.

The reaction lacquers according to the invention preferably contain at least one monomeric and at least one polymeric ester of acrylic or methacrylic acid as essential components. Corresponding mixtures can also be employed. Expediently, solutions of the polymer in the monomer, which advantageously are syrupy, are employed in the production of the lacquers. In also is possible to employ the monomer in a prepolymerized state. In both instances the solution advantageously should contain 10 to 70% of polymer. According to a preferred embodiment of the invention a polymer-monomer mixture of acrylic acid or methacrylic acid esters, preferably, methyl methacrylate, which is produced in the form of a prepolymer, for example, according to the procedures given in Belgian Patent 572,359, French Patents 1,221,537, 1,242,919 and German published application 1,083,057, is employed. Such prepolymers are usually produced in a so-called single pot reaction, preferably, with the aid of a sulfur containing regulator, such as an ester of mercapto acetic acid or a mercaptan or one of its derivatives, and/or in the presence of a radical forming catalyst, such as azodiisobutyric acid dinitrile. Such prepolymers in general have a polymer content of about 20 to 50%. When prepolymers are employed which have been produced with the aid of a mercaptan or a mercapto acetic acid ester as regulators an excess of such regulators can be used in the prepolymerization to supplement the catalyst system employed to cure the lacquer.

One or more unsaturated polyester resins can also be employed as an essential component of the reaction lacquers according to the invention. Polyester resins are derived from dibasic carboxylic acids or their anhydrides, such as maleic acid, maleic acid anhydride, itaconic acid, fumaric acid, phthalic acid and the like, and polyhydric alcohols, such as glycol, diglycol, propane diol, butane diol, as well as cyclic alcohols, either the acid or alcohol component containing at least one ethylenic unsaturation and essentially are polycondensation products of such carboxylic acid and alcohol components (see Polyesters and Their Applications, Bjorksten et al., Reinhold Publishing Corp., 1956, p. 11, also U.S. Patents 2,195,362 and 2,255,313).

The unsaturated polyester resins can also be employed in any desired ratio in combination with the esters of acrylic or methacrylic acid and also even when the latter are employed in the form of a prepolymer. Above all, when polyester resins are employed, solutions with high polymer content can be obtained.

In addition to the substances named, other organic compounds which are copolymerizable therewith can also be present in the reaction lacquers according to the invention. Examples of such copolymerizable compounds, for instance, are allyl and vinyl compounds, such as styrene, vinyl acetate, cross-linking agents, such as divinyl benzene, esters of acrylic or methacrylic acids with polyhydric or unsaturated alcohols, triallyl cyanurate and triallyl isocyanurate.

In addition, the reaction lacquers according to the invention can also contain known plasticizers, preferably in quantities up to 30% by weight, and/or coloring or filling materials and/or small quantities of paraffin and/or UV stabilizers. Highly disperse metal or metalloid oxides, such as, silica, produced by a vapor phase decomposition reaction, are especially suited as fillers.

The reaction lacquers according to the invention, even when the mercaptan and amine have been added thereto, are stable upon storage at room temperature for several months. They can even be stored for several days at temperatures as high as 60° C. After addition of the peroxidic component they harden even in the form of thin films with access of air thereto very rapidly to extraordinarily hard practically colorless films. The evaporation losses are only very slight. To reduce the evaporation losses still further it is possible to add small quantities of paraffin or wax. The reaction lacquers are especially suited for coating wood and exhibit good hardening and good bonding properties even on tropical woods such as teak, palisander and makassar which previously required good sealing before application of lacquers. The lacquers according to the invention furthermore can be used with good success for coating stone, concrete, metal and the like.

The lack of coloration engendered by the use of the catalyst system according to the invention is also maintained even when the lacquer films are subjected to an after tempering treatment (such treatment in itself not being necessary). When small quantities of a UV stabilizer are added they also exhibit an extraordinarily good resistance against UV irradiation. The lacquer films in addition exhibit a good gloss so that subsequent processing often is not required.

German Eastern Zone Patent 19,776 discloses a process for the production of bulk polymers of acrylic acid, methacrylic acid and their esters with the aid of redox systems for dental purposes. The homologues of dimethyl aniline serve as the reducing component of such redox systems. The discoloration engendered by the use of these substances is hindered according to such patent by the addition of organic compounds of the formula

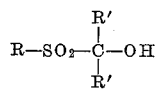

where R=alkyl or aryl and R'=hydrogen or alkyl or the addition of mercaptans or thioethers. The starting compositions according to such patent are always monomer-polymer mixtures (powder-liquid) of such character that they can only be processed by stuffing or tamping and the like. Consequently they are cements which no longer have flow or spreading characteristics such as are essential for lacquers and therefore are entirely unsuited as lacquers. Such patent furthermore does not teach that only a certain type of peroxidic compound, namely, the acyl peroxides and at least equivalent quantities of mercaptans or mercapto acetic acid esters are required to produce high quality reaction lacquers. In addition, such patent also discloses sulfur compounds which are entirely unsuitable for the production of lacquers according to the invention.

The following examples will serve to illustrate the invention with reference to several specific embodiments thereof.

*Example 1*

A prepolymer of methyl methacrylate having a polymer content of 31–32% and a viscosity of 500–600 cp. which was obtained from pure methyl methacrylate with azodiisobutyric acid dinitrile as catalyst and glycol dimercapto acetate as regulator was mixed with a benzoyl peroxide paste (50% in dibutyl phthalate), various amines and mercaptans in various amounts and poured out to 1 mm. thick films on glass plates. The resulting films were allowed to cure at room temperature with access to air. The curing times and color characteristics of the films are given in the following table. To judge the color, the color of the pure starting substance was used as the base and assigned color step 0 and a distinct brown coloration was assigned color step 10. As a consequence in the following tables color step 1 signifies almost colorless, color step 3 a very light yellowish coloration and color step 6 a light yellowish color.

| Benzoyl-peroxide paste, percent | Amine, percent | Mercaptan, percent | Color Step | Curing Time, Min. |
|---|---|---|---|---|
| 3 | 0.1 Diisopropylol-p-toluidine | 0.70 Glycol dimercapto acetate | 1 | 60 |
| 3 | do | 1.20 Glycol dimercapto acetate | 1 | 60 |
| 3 | 0.2 Diisopropylol-p-toluidine | 0.70 Glycol dimercapto acetate | 1 | 40 |
| 3 | do | 1.20 Glycol dimercapto acetate | 1.5 | 40 |
| 3 | 0.3 Diisopropylol-p-toluidine | 0.70 Glycol dimercapto acetate | 1.5 | 30 |
| 3 | 0.1 Diisopropylol-p-toluidine | 1.20 Lauryl mercaptan | 1 | 65 |
| 3 | 0.3 Diethylol-p-toluidine | 1.20 Glycol dimercapto acetate | 2.5 | 20 |
| 3 | 0.3 Di-n-butylol-p-toluidine | do | 1.5 | 20 |
| 3 | 0.3 Diethyl aniline | do | 1 | 75 |
| 3 | 0.3 Dimethyl-p-toluidine | do | 1 | 25 |

Example 2

The procedure of Example 1 was repeated except that the mercaptan was added already in the production of the prepolymer so as to provide the required quantity for the curing catalyst system for the lacquer. The results are given in the following table:

| Benzoyl-peroxide paste, percent | Amine, percent | Mercaptan, percent | Color Step | Curing Time, Min. |
|---|---|---|---|---|
| 3 | 0.1 Diisopropylol-p-toluidine | 0.53 Glycol dimercapto acetate | 1 | 30 |
| 3 | do | 0.70 Glycol dimercapto acetate | 0.5 | 28 |
| 3 | do | 1.50 Glycol dimercapto acetate | 0.5 | 50 |
| 3 | 0.2 Diisopropylol-p-toluidine | 0.53 Glycol dimercapto acetate | 1.5 | 25 |
| 3 | do | 0.7 Glycol dimercapto acetate | 1 | 20 |
| 3 | 0.3 Diisopropylol-p-toluidine | 1.50 Glycol dimercapto acetate | 1.5 | 16 |
| 3 | 0.3 Diethylol-p-toluidine | 1.5 Glycol dimercapto acetate | 2 | 17 |
| 3 | 0.3 Di-n-butylol-p-toluidine | do | 2 | 17 |
| 3 | 0.3 Diethyl aniline | do | 1.5 | 70 |
| 3 | 0.3 Dimethyl-p-toluidine | do | 1.5 | 17 |

Example 3

The procedure of Example 1 was repeated except that various casting resins were employed instead of the prepolymer employed in Example 1.

| Casting Resin | Benzoyl peroxide paste, percent | Amine, percent | Mercaptan, percent | Color Step | Curing Time, Min. |
|---|---|---|---|---|---|
| Polymethylmethacrylate 30% in solution in monomeric methyl methacrylate. | 3 | 0.3 Diisopropylol-p-toluidine | 1.2 Glycol dimercapto acetate | 1.5 | 40 |
| Do | 3 | 0.3 Dimethyl-p-toluidine | do | 1 | 40 |
| Polyester casting resin of 70% unsaturated polyester¹ and 30% monostyrene containing 0.01% of hydroquinone. | 3 | 0.3 Diisopropylol-p-toluidine | do | 2 | 60 |
| Do | 3 | 0.3 Dimethyl-p-toluidine | do | 1.5 | 60 |
| Mixture of prepolymer according to Example 1 and unsaturated polyester.¹ | 3 | 0.3 Diisopropylol-p-toluidine | do | 3 | 40 |

¹ Unsaturated polyester = polyester of maleic acid, ortho phthalic acid and propylene glycol-1,2 in molecular proportions of 1:1:2.

Example 4

The procedure of Example 1 was repeated except that various monomer mixtures were used in the preparation of the prepolymer. In each 1.5% of glycol dimercapto acetate was already added to the production of the prepolymer and 0.3% of diisopropylol-p-toluidine and 3.0% of 50% benzoyl peroxide paste as in Example 1 added to the prepolymer.

The results are given in the following table:

| Monomer mixture | Color Step | Curing Time, Min. |
|---|---|---|
| 90% MMA+10% ethyl acrylate | 1.5 | 12 |
| 90% MMA+10% butyl acrylate | 1.5 | 14 |
| 95% MMA+5% ethyl hexyl acrylate | 1.5 | 14 |
| 95% MMA+5% decyl-octyl acrylate | 1.5 | 15 |
| 95% MMA+5% cellosolve acrylate | 1.5 | 15 |
| 100% MMA+10% monostyrene added to prepolymer | 1.5 | 15 |

MMA = methyl methacrylate.

Example 5

The procedure of Example 1 was repeated using 4,4'-parachlorobenzoyl peroxide instead of benzoyl peroxide in the 50% paste. 1.5% of glycol dimercapto acetate and 0.3% of diisopropylol-p-toluidine were employed as the remainder of the catalyst system. The films were fully cured after 25 minutes and exhibited color step 1.

Example 6

An unsaturated polyester casting resin consisting of 30% by weight of monostyrene and 70% by weight of an unsaturated polyester of maleic acid and propylene glycol, 1,2 in a molecular ratio of 1:1 was employed as the base. 0.3% of paraffin was added thereto and then a catalyst system composed of 0.3% of diisopropylol-p-toluidine, 3.0% of the benzoyl peroxide paste according to Example 1 and 1.5% of glycol dimercapto acetate incorporated therein. Coatings 1 mm. thick thereof were applied to beech and teak wood without prior sealing. In both instances practically colorless coatings which cured fully in 30 minutes with good bond to the wood were obtained.

Example 7

The procedure of Example 6 was repeated using the prepolymer of Example 1. In this instance also the films were fully cured in 30 minutes and were firmly bonded to both types of wood.

Example 8

The procedure of Example 6 was repeated again, this time using the prepolymer of Example 2 in which 1.5% of glycol dimercapto acetate had already been added during its production. 3.0% of the benzoyl peroxide paste according to Example 1 were employed as catalyst and 0.2% of diisopropylol-p-toluidine as accelerator. The films were fully cured in 10 minutes and were firmly bonded to both types of wood.

*Example 9*

In comparison, the procedure of Example 1 was repeated but without addition of a mercaptan. The quantity of amine employed was 0.3%:

| Amine | Color Step | Curing Time, Min. |
|---|---|---|
| Diethylol-p-toluidine | 8 | 40 |
| Dimethyl-p-toluidine | 9 | 40 |

*Example 10*

The procedure of Example 9 was followed using various casting resins instead of the prepolymer

| Casting Resin | Amine | Color Step | Curing Time, Min. |
|---|---|---|---|
| Polymethyl methacrylate 30% solution in monomeric methyl methacrylate. | Diisopropyl-p-toluidine | 9 | 40 |
| | Dimethyl-p-toluidine | 10 | 40 |
| Polyester casting resin as in Example 3 | Dimethyl-p-toluidine | 8 | 60 |

*Example 11*

85 parts by weight of a prepolymer of a viscosity of 2400 cp. (at 120° C.) prepared in the usual manner from pure methyl methacrylate using azodiisobutyric acid dinitrile as catalyst and 0.6% of glycol dimercapto acetate as regulator were thinned wtih 15 parts by weight of monomeric methyl methacrylate. Then 0.2 part by weight of diisopropylol-p-toluidine and 4 parts by weight of a 25% solution of toluyl peroxide in dimethyl phthalate were admixed therewith. A film thereof 1 mm. thick cast on a glass plate was hard after 33 minutes at room temperature (21° C.) with exposure to air. The cured lacquer film is substantially colorless and exhibited a coloration of color step 1.5.

*Example 12*

100 parts by weight of a prepolymer of a viscosity of 20 DIN/sec. (Ford—discharge cup, 4 mm. nozzle, +20° C.) prepared in the usual way from pure methyl methacrylate using azodiisobutyric acid dinitrile as catalyst and 1.8% of lauryl mercaptan as regulator were mixed with 0.2% of diisopropylol-p-toluidine and 2% of a 50% benzoyl peroxide paste in dibutyl phthalate. A film thereof 1 mm. thick cast on a glass plate was hard after 45 minutes at room temperature with exposure to air. The cured lacquer film exhibited a coloration of color step 2.

*Example 13*

100 parts by weight of a prepolymer of a viscosity of 1800 cp. prepared in the usual manner from pure methyl methacrylate using azodiisobutyric acid dinitrile as a catalyst and 1.8% of isooctylthioglycolate as regulator were thinned with 15 parts by weight of monomeric methyl methacrylate. Then 0.2 part by weight of diisopropylol-p-toluidine and 2% of a 50% benzoyl peroxide paste in dibutyl phthalate were admixed therewith. A film thereof 1 mm. thick cast on a glass plate cured in 33 minutes at room temperature with exposure to air. The cured lacquer film exhibited a coloration of color step 1.

We claim:

1. A cold curing reaction lacquer essentially composed of at least one component curable by polymerization selected from the group consisting of (1) mixtures of at least one monomeric and at least one polymeric lower alkyl ester of an acid selected from the group consisting of acrylic acid and methacrylic acid, (2) an unsaturated polyester containing ethylenic unsaturation which is a polycondensation product of a dicarboxylic acid and a polyhydric alcohol, (3) mixtures of at least one monomeric and at least one polymeric lower alkyl ester of an acid selected from the group consisting of acrylic acid and methacrylic acid together with another organic compound copolymerizable therewith and (4) an unsaturated polyester containing ethylenic unsaturation which is a polycondensation product of a dicarboxylic acid and a polyhydric alcohol together with another organic compound copolymerizable with such unsaturated polyester and a catalytically effective amount of a catalyst system for said curable component essentially consisting of (1) an acyl peroxide, (2) a functional organic sulfur compound selected from the group consisting of monofunctional and polyfunctional mercaptans and esters of mercapto acetic acid of the formulae $HS-CH_2-COOR$ and $HS-CH_2-COO-R_1-OOC-CH_2-SH$ wherein R is selected from the group consisting of alkyl, aryl, alkoxy alkyl and alkoxy alkoxy alkyl and $R_1$ is selected from the group consisting of alkylene, oxy-alkylene or poly-oxy-alkylene, the quantity of such functional organic sulfur compound being at least equivalent to the acyl peroxide, and (3) a tertiary amine having at least one aromatic radical directly bonded to the nitrogen atom thereof.

2. A cold curing reaction lacquer according to claim 1 in which the quantity of acyl peroxide is 0.5 to 3% by weight and the quantity of tertiary amine is 0.05 to 1.0% by weight.

3. A cold curing reaction lacquer according to claim 1 in which the quantity of acyl peroxide is about 1.5% by weight and the quantity of tertiary amine is 0.1 to 0.5% by weight.

4. A cold curing reaction lacquer according to claim 1 in which the acyl peroxide is an aromatic diacyl peroxide, the organic sulfur compound is lauryl mercaptan and the tertiary amine is dimethyl-p-toluidine.

5. A cold curing reaction lacquer according to claim 1 in which the acyl peroxide is an aromatic diacyl peroxide, the organic sulfur compound is lauryl mercaptan and the tertiary amine is diisopropyl-p-toluidine.

6. A cold curing reaction lacquer according to claim 1 in which the acyl peroxide is an aromatic diacyl peroxide, the organic sulfur compound is glycol dimercapto acetate and the tertiary amine is dimethyl-p-toluidine.

7. A cold curing reaction lacquer according to claim 1 in which the acyl peroxide is an aromatic diacyl peroxide, the organic sulfur compound is glycol dimercapto acetate and the tertiary amine is diisopropylol-p-toluidine.

8. A cold curing reaction lacquer according to claim 1 in which the composition curable by polymerization is a solution of polymethyl methacrylate in methyl methacrylate.

9. A cold curing reaction lacquer according to claim 1 in which the composition curable by polymerization is a solution of polymethyl methacrylate in methyl methacrylate in combination with an unsaturated polyester containing ethylenic unsaturation which is a polycondensation product of a dicarboxylic acid and a polyhydric alcohol.

10. A cold curing reaction lacquer according to claim 1 in which the composition curable by polymerization is a prepolymer of methyl methacrylate containing 10 to 50% by weight of polymethyl methacrylate in methyl methacrylate.

References Cited by the Examiner

UNITED STATES PATENTS

| | | | |
|---|---|---|---|
| 2,480,928 | 9/1949 | Hurdis | 260—866 |
| 2,946,770 | 7/1960 | Bader et al. | 260—861 |
| 3,051,679 | 8/1962 | Forsyth | 260—862 |
| 3,077,463 | 2/1963 | Forster et al. | 260—865 |
| 3,154,600 | 10/1964 | Munn | 260—89.5 |

FOREIGN PATENTS

| | | |
|---|---|---|
| 592,719 | 9/1947 | Great Britain. |
| 768,902 | 2/1957 | Great Britain. |
| 833,584 | 4/1960 | Great Britain. |
| 1,083,057 | 6/1960 | Germany. |
| 1,221,537 | 1/1960 | France. |

WILLIAM H. SHORT, *Primary Examiner.*

SAMUEL H. BLECH, *Examiner.*

W. H. SHORT, C. A. WENDEL, *Assistant Examiner.*